United States Patent
Arai (10) Patent No.: US 7,200,382 B2
(45) Date of Patent: Apr. 3, 2007

(54) ADVERTISEMENT PRESENTING AND CHARGING SYSTEM

(75) Inventor: Masatoshi Arai, Nakano-ku (JP)

(73) Assignee: Calsonic Kansei Corporation, Tokyo (JP)

( * ) Notice: Subject to any disclaimer, the term of this patent is extended or adjusted under 35 U.S.C. 154(b) by 231 days.

(21) Appl. No.: 10/771,443

(22) Filed: Feb. 5, 2004

(65) Prior Publication Data

US 2004/0155797 A1 Aug. 12, 2004

(30) Foreign Application Priority Data

Feb. 5, 2003 (JP) ............................. 2003-028767

(51) Int. Cl.
*G08G 1/00* (2006.01)
*H04M 11/00* (2006.01)

(52) U.S. Cl. .................... 455/405; 455/99; 340/815.4; 235/375; 709/207

(58) Field of Classification Search ................ 455/405, 455/99, 456.1, 456.3, 456.6; 340/815.4; 235/375; 709/207
See application file for complete search history.

(56) References Cited

U.S. PATENT DOCUMENTS

| | | | |
|---|---|---|---|
| 6,356,877 B1 | 3/2002 | Schulden | |
| 6,812,851 B1* | 11/2004 | Dukach et al. | 340/815.4 |
| 2002/0111146 A1* | 8/2002 | Fridman et al. | 455/99 |
| 2003/0023698 A1* | 1/2003 | Dieberger et al. | 709/207 |
| 2003/0222134 A1* | 12/2003 | Boyd | 235/375 |

FOREIGN PATENT DOCUMENTS

| | | |
|---|---|---|
| JP | 2002-269607 | 9/2002 |
| JP | 2003-050558 | 2/2003 |
| WO | 00/11642 | 3/2000 |

* cited by examiner

*Primary Examiner*—William D. Cumming
(74) *Attorney, Agent, or Firm*—Wenderoth, Lind & Ponack, L.L.P.

(57) ABSTRACT

An advertisement presenting and charging system includes an instrument C/U and a navigator provided in a motor vehicle, and a display device obtaining information from the instrument C/U and the navigator. The display device is connected to a timer detecting time and an operation switch for changeover between operation and non-operation of the display device. The display device is connected to an ETC unit and an ETC antenna, so that a plurality of advertisement data are sent to the display device when the display device communicates with an ETC fixed station. The ETC fixed station sends an entrance data including an advertisement data to the display device, and the display device sends an exit data including a traveling section, a traveling time, a traveling distance to the ETC fixed station.

5 Claims, 6 Drawing Sheets

ADVERTISEMENT PRESENTING AND CHARGING SYSTEM

BACKGROUND OF THE INVENTION

1. Field of the Invention

The present invention relates to an advertisement presenting and charging system that presents advertisement using a motor vehicle and charges according to the advertisement.

2. Description of the Related Art

As a conventional advertisement system using a moving body such as a motor vehicle, there has been a system in which an advertisement is painted, pasted, or attached easily detachably on a motor vehicle, for example, a bus and payment for the advertisement is made for a predetermined period. Also used in recent years is a system, as disclosed in, for example, Japanese Patent Laid-open No. 2001-202455, which enables real-time advertisement display in a route bus by using roadside communications based on Dedicated Short Range Communication (DSRC) to exchange data of the advertisement between the bus and road side stations.

In the conventional system, however, an advertising provider often demands of an advertising agency (a party engaged in the advertisement activity) that the advertisement activity should cover predetermined traveling distance for displaying its advertisement. This demand has been a burden on the advertising agency due to the need for measuring and certifying the actual traveling distance for its advertisement. On the other hand, the advertising provider can not grasp based on only the traveling distance how much advertisement effect has been produced.

Further, for changing advertisements timely and easily, the conventional system needs new equipment of communications, namely the infrastructure, and telephone charges or the like in order to obtain information through, for example, a cellular phone. Moreover, even the use of the DSRC system has a problem such as the need for installing new dedicated base stations.

The present invention is made in view of the problems described above, and an object thereof is to provide an advertisement presenting and charging system that allows an advertising agency to be free from burden of measuring and certifying information for displaying an advertisement and changing advertisements without newly installing dedicated base station.

SUMMARY OF THE INVENTION

In order to achieve the objects stated above, an advertisement presenting and charging system of the present invention includes an automatic toll collecting system for toll road to send entrance data including the advertisement data and receive exit data through wireless communication; and a motor vehicle with on-board devices including a display device, the on-board devices receiving the entrance data so that the display device displays an advertisement based on the advertisement data when the motor vehicle enters the toll road, and the on-board devices detecting information about a condition under which the advertisement is displayed by the display device to send the exit data including the information about the condition; wherein an amount of an advertisement charge is set according to the information about the condition included in the exit data.

In the advertisement presenting and charging system described above, the motor vehicle communicates with the automatic toll collecting system for toll road when entering and exiting from the toll road, and obtains advertisement data during this wireless communication. This results in that new dedicated fixed station is not necessary to communicate between the ground and the motor vehicle, which enables cost reduction of equipment.

The on-board devices detects the information about the condition under which the advertisement is actually displayed and sends to the automatic toll collecting system, which enables the advertising agency to be free from burden of measuring and certifying information for displaying the advertisement and changing.

In order to achieve the objects stated above, an on-board devices for an advertisement presenting and charging system comprises: a wireless communicating unit to receive an entrance data including advertisement data from an automatic toll collecting system and send an exit data to the automatic toll collecting system; a display device to display an advertisement based on the advertisement data included in the entrance data; and a detector to detect information about a condition under which the advertisement is displayed by the display device to send the exit data including the information about the condition to be a base of charging amount of the advertisement.

In the on-board devices for the advertisement presenting and charging system described above, the wireless communicating unit of the motor vehicle communicates with the automatic toll collecting system for toll road when entering and exiting from the toll road, and obtains advertisement data during this wireless communication. This results in that new dedicated fixed station is not necessary to communicate between the ground and the motor vehicle, which enables cost reduction of equipment.

The detector detects the information about the condition under which the advertisement is actually displayed and the wireless communicating unit sends the exit data including the information about the condition to the automatic toll collecting system, which enables the advertising agency to be free from burden of measuring and certifying information for displaying the advertisement and changing.

Preferably, the information about the condition includes at least one of a traveling section, a traveling time, and a traveling distance during displaying the advertisement.

The information including at least one of the traveling section, the traveling time, and the traveling distance is sent to the automatic toll collecting system for toll road by wireless communication. This makes it possible to charge according to the advertisement contents, and at least one of the traveling section, the traveling time, the traveling distance during actually displaying the advertisement, so that an advertising agency can be free from measuring and certifying information during actually displaying the advertisement. Using more items of the traveling section, the traveling time, the traveling distance, an amount of the payment can be set more commensurate with an actual advertisement effect.

Preferably, the on-board devices has a switching unit to shift to one of select operation and non-operation of the display device and select advertisement contents to be displayed based on the advertisement data included in the entrance data.

This allows a passenger of the motor vehicle to select the advertisement contents and enables the passenger to display the advertisement, determining whether or not it is desirable to present the advertisement and where and when it is undesirable to display the advertisement.

Preferably, the amount of the advertisement charge is deducted from a toll for a toll road.

Therefore, the toll for the toll low is reduced, which promotes the use of toll roads.

Preferably, the entrance data includes number of advertisements, an advertisement ID, an advertising provider's name, number of advertisement characters, and the advertisement, and the exit data including number of advertisements, the advertisement ID, number of advertisement times, advertisement time, and the advertisement.

Thus, when the motor vehicle enters a toll road, the display device communicates with the automatic toll collecting system for toll road to obtain the entrance data including the number of advertisements, the advertisement ID, the advertising providers name, the number of advertisement characters, and the advertisement contents. The display device displays the advertisement based on the obtained entrance data, for example, according to the operation by a passenger of the motor vehicle. Through this operation, the selections corresponding to the number of advertisements are made, data identification of the advertisement display is made possible by the advertisement ID, and the advertisement contents are used for the advertisement display while the motor vehicle is running on the toll road. When the motor vehicle goes out of the toll road, the data on the advertisement thus presented are sent to the automatic toll collecting system for toll road from the display device as the exit data including the number of advertisements, the advertisement ID, the number of advertisement times, the advertisement time, and the advertisement place. Thereby, the kinds of advertisements presented while the vehicle is running on the toll road are sent as the number of advertisements. The advertisement contents are identified by the advertisement ID. The number of advertisement times, the advertisement time, and the advertisement places are sent. Thus, it is possible to charge for the advertisement activity based on the actual advertisement conditions. In this manner, owing to the use of the automatic toll collecting system for toll road, the number of communication times and cost necessary for changing the advertisement contents and charging are reduced.

BRIEF DESCRIPTION OF THE DRAWINGS

The objects, features and advantages of the present invention will become apparent as the description proceeds when taken in conjunction with the accompanying drawings, in which.

DETAILED DESCRIPTION OF THE PREFERRED EMBODIMENTS

Hereinafter, an advertisement presenting and charging system according to an embodiment of the present invention will be described with reference to the drawings.

Figure 1:
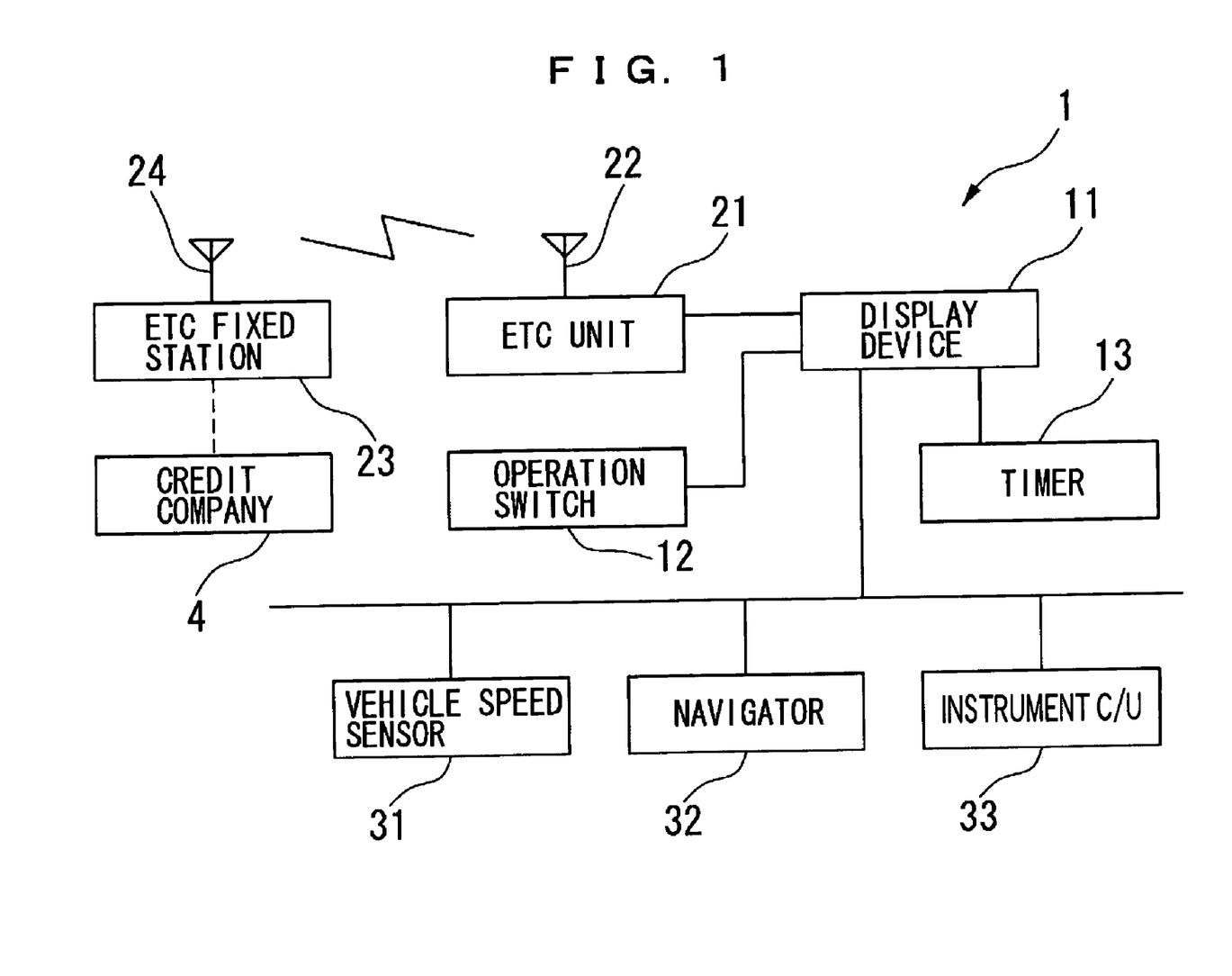
FIG. 1 is a block diagram showing the main structure of an advertisement presenting and charging system of an embodiment of the present invention.
Figure 2:
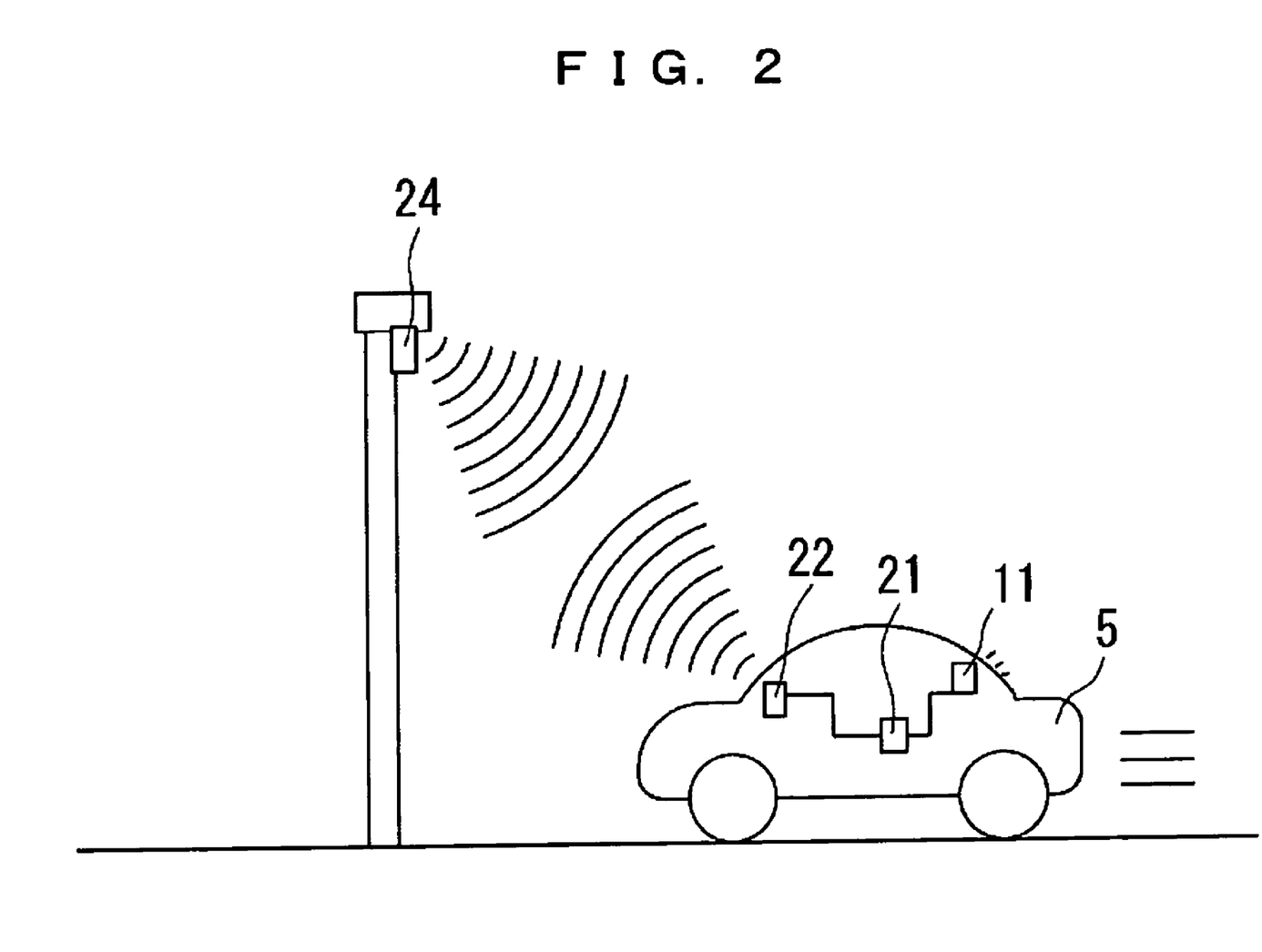
FIG. 2 is a schematic view of an ETC fixed station side antenna and a car with an ETC unit according to the advertisement presenting and charging system of the embodiment shown in FIG. 1 when they exchange data relative to advertisement.
Figure 3:
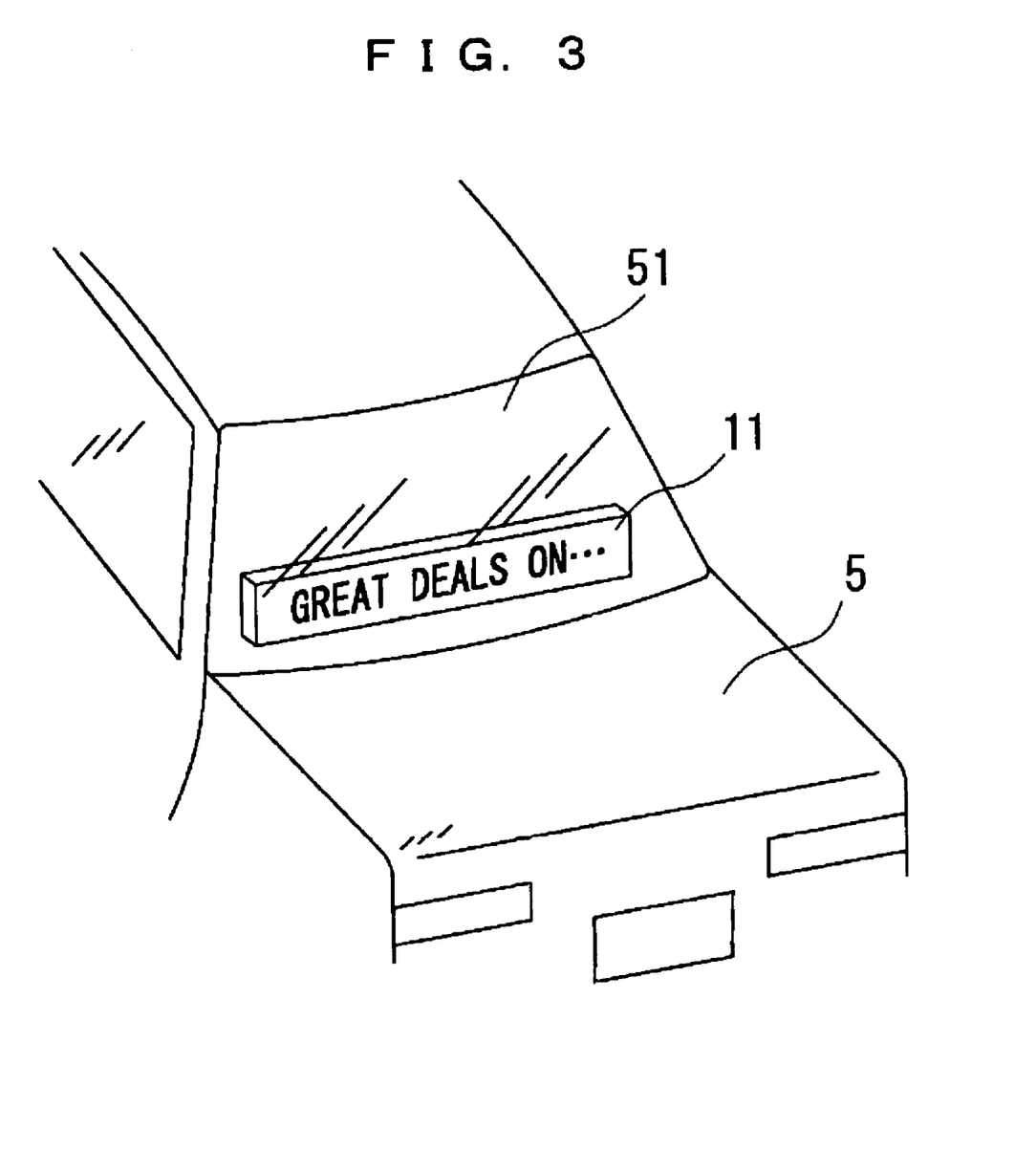
FIG. 3 is a rear perspective view of the car, shown in FIG. 2, with a display device of the advertisement presenting and charging system of the embodiment.

First, the structure of the advertisement presenting and charging system according to the embodiment will be described. FIG. 1 is a block diagram showing the main structure of an ETC fixed station side and an on-board devices including an ETC unit and a display device for advertisement according to the advertisement presenting and charging system of the embodiment. FIG. 2 is a schematic view of an ETC fixed station side antenna and a car with the on-board devices shown in FIG. 1 when they exchange data relative to advertisement. FIG. 3 is a perspective view of the display device, shown in FIGS. 1 and 2, of the car.

In the following description, Electronic Toll Collection (ETC) (registered trademark) System is one of the automatic toll collecting systems for toll road, which enables a motor vehicle to pass through highway toll gates without stopping.

Referring to FIG. 1, the advertisement presenting and charging system 1 of this embodiment has an ETC fixed station 23 installed at entrance and exit gates of a toll road, and a motor vehicle 5, shown in FIG. 2, with on-board devices such as an ETC unit 21, a display device 11, and so on.

The ETC fixed station 23 exchanges data between it and the ETC unit 21 of the motor vehicle 5, as shown in FIG. 2, through an ETC fixed station side antenna 24 of the ETC fixed station 23 and an ETC antenna 22 of the ETC unit 21 when the motor vehicle 5 pass through highway toll gates. This data exchange at the entrance and exit gates is carried out based on Dedicated Short Range Communication (DSRC). In the DSRC system, ground to on board communication occurs dynamically over two short range microwave links. The ETC unit 21 with the ETC antenna 22 functions as a wireless communicating unit of the present invention.

The ETC fixed station 23 is linked to a credit company 4 with which a driver contracts to pay a toll based on the data obtained from the ETC fixed station 24. Advance contract is made such that the driver of the motor vehicle 5 is allowed to use a credit card, a card exclusively for ETC, or the like based on data exchanged between the credit company 4 and the ETC fixed station 23 through communication cable or the like.

The on-board devices include the ETC unit 21 with the ETC antenna 22, the display device 11 which receives data of an advertisement from the ETC fixed station 24 through the ETC unit 21 and presents an advertisement on its screen, an operation switch 12 operated by the passenger, such as a driver, of the motor vehicle 5 to turn the power ON/OFF to the display device 11 and select the advertisement contents to be displayed, and a timer 13 to count time for obtaining actually displayed time. The operation switch 12 functions as a switching unit of the present invention.

The display device 11 has a controller, not shown, provided therein, and is connected to the ETC unit 21 so that DSRC can be used to exchange data between the display device 11 and the ETC fixed station 23 via the ETC unit 21 and the ETC antenna 22.

The display device 11 is also connected through an in-vehicle communication line to other on-board devices, such as a vehicle speed sensor 31 to detect a vehicle speed and send it to the display device 11, a navigator 32, using GPS and the like, to determine the vehicle position and send it to the display device 11, and an instrument control unit (C/U) 33 to control instruments, not shown and send a traveling distance to the display device 11. With this connection to the above on-board devices, the display device 11 receives vehicle speed information from the vehicle speed sensor 31, vehicle position information from the navigator 32, and traveling distance information from the instrument C/U 33 respectively to obtain information with reference to actual advertisement displaying. The vehicle speed sensor 31, the navigator 32, and the instrument C/U 33 respectively function as a detector of the present invention.

As shown in FIG. 3, the display device 11 is provided at the rear side of a passenger compartment in the motor vehicle 5 and displays an advertisement at the inner side of a rear window 51 so that the advertisement can be seen from the outside. The display device 11 has a large number of LEDs arranged thereon and displays characters and graphics by the combination of their light spots.

In the advertisement presenting and charging system 1 of this embodiment, the motor vehicle 5 is allowed to pass without stopping when entering a toll road from a general road and when exiting from the toll road to a general road. At those times, the motor vehicle 5 receives advertisement data from the ETC fixed station 23 to display it and send advertisement displaying data to the fixed station 23.

Figure 4:
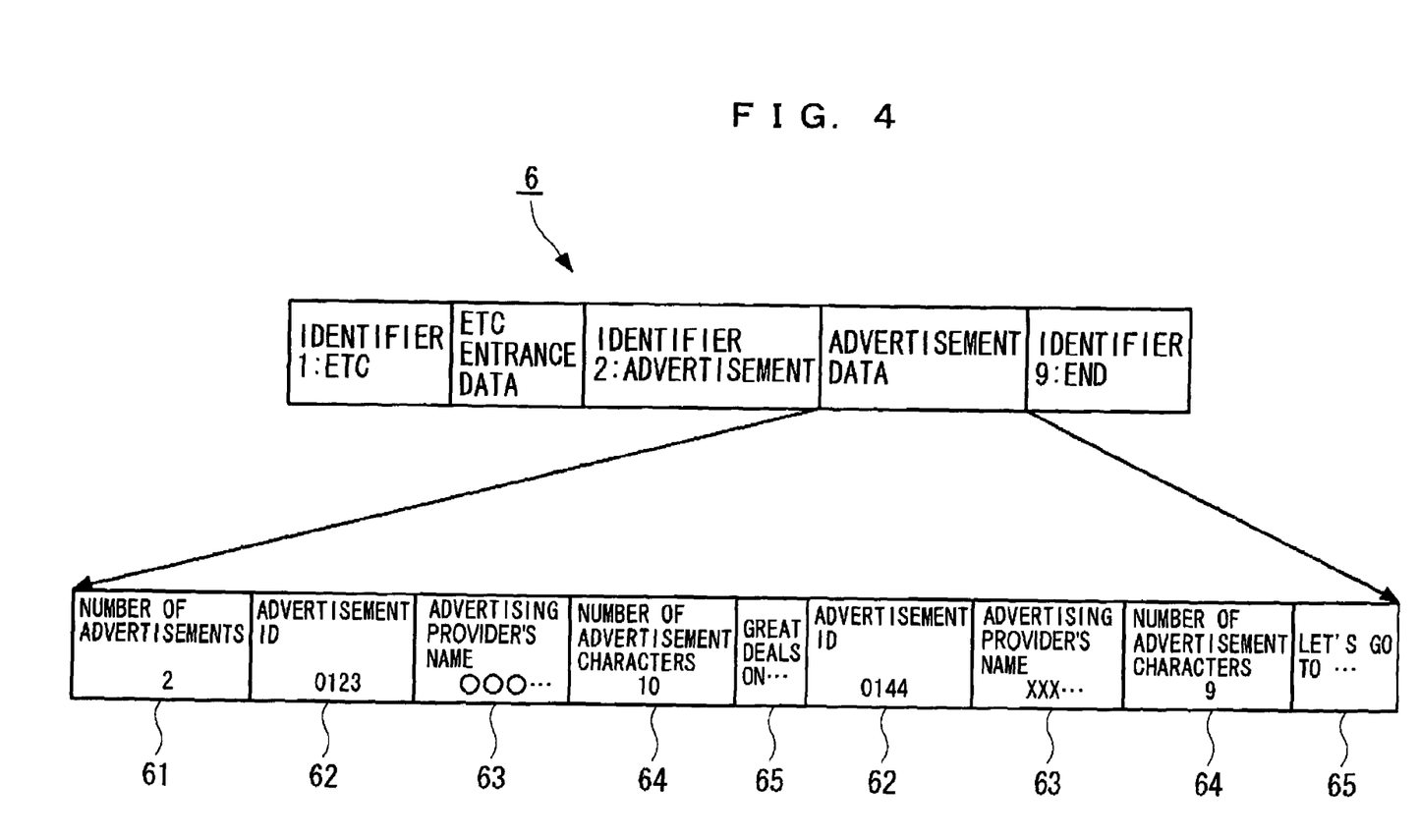
FIG. 4 is a schematic view showing entrance data sent from an automatic toll collecting system for toll road to the display device of the advertisement presenting and charging system of the embodiment when the car enters an ETC entrance gate.
Figure 5:
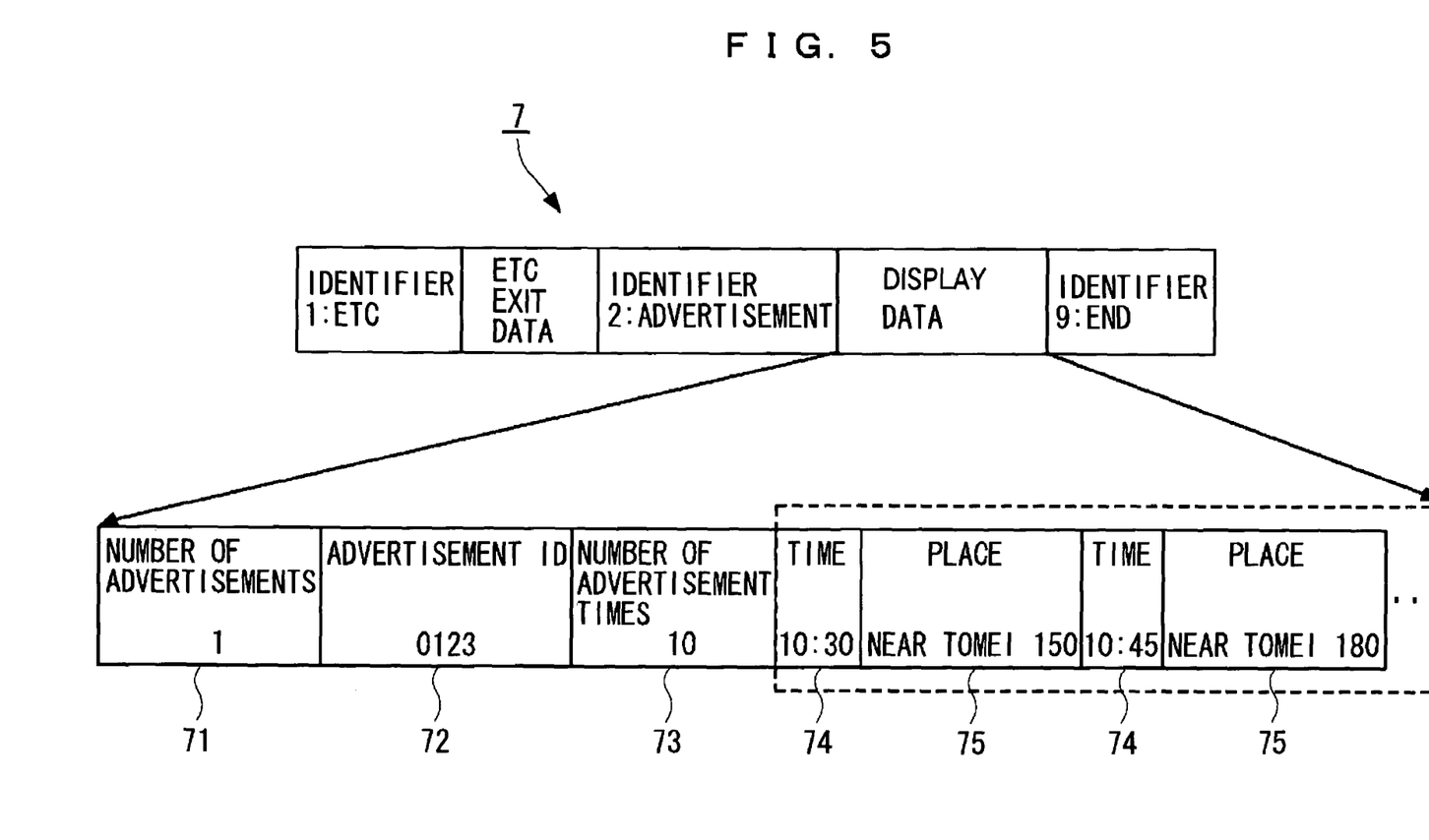
FIG. 5 is a schematic view showing exit data sent from the display device to the automatic toll collecting system for toll road of the advertisement presenting and charging system of the embodiment when the car goes out of the ETC exit gate.

FIG. 4 is a schematic view showing entrance data sent from the ETC fixed station 23 to the display device 11 when the motor vehicle 5 enters an entrance gate of an automatic toll collecting system for toll road from. FIG. 5 is a schematic view showing exit data sent from the motor from the display device 11 to the ETC fixed station 23 when the motor vehicle goes out of an exit gate of the automatic toll collecting system for toll road.

The entrance data 6 that the motor vehicle 5 obtains from the ETC fixed station 23 by DSRC when entering the toll road includes, as shown in FIG. 4, identifiers (here, for example 1:ETC, 2:ADVERTISEMENT and 9:END), ETC entrance data, and advertisement data. The advertisement data includes the number of advertisements 61 (here, for example 2) indicating how many advertisement data are included, advertisement IDs 62 (here, for example 0123 and 0144) for identification of the kinds of advertisements, advertising providers' names 63 (here, for example OOO . . . and XXX . . . ) showing the company names of advertising providers, the number of advertisement characters 64 (here, for example 10 and 9) used for a display process and a charging process, and advertisement contents 65 being the contents actually displayed, for example, "GREAT DEALS ON . . . ", and "LET'S GO TO . . . ".

On the other hand, the exit data 7 that the motor vehicle 5 sends to the ETC fixed station 23 by DSRC when going out of the toll road includes, as shown in FIG. 5, identifiers (here, for example 1:ETC, 2:ADVERTISEMENT, and 9:END), ETC exit data, and display data. The display data includes the number of advertisements 71 (here, for example 1) indicating how many kinds of advertisements have been presented, advertisement IDs 72 (here, for example 0123) for identification of the kinds of advertisements, the number of advertisement times 73 (here, for example 10) indicating how many times the advertisement contents 65 have been displayed, the advertisement times 74 (here, for example 10:30 and 10:45) indicating the time when the advertisement was displayed, and advertisement places 75 (here, for example, NEAR TOMEI 150 and 180) showing where the advertisement was displayed.

Next, the operation of the advertisement presenting and charging system 1 according to the present embodiment will be described.

The data obtaining operation before the motor vehicle 5 enters a toll road will be first described.

In order to use the advertisement presenting and charging system 1 and ETC system, an owner of the motor vehicle 5 makes a contract with the credit company 4 in advance so that a toll for a toll road is deducted based on data from the ETC fixed station 23 from his/her credit card.

When entering the toll road from a general road, the motor vehicle 5 is allowed to pass through an ETC entrance gate without stopping. Namely, as the motor vehicle 5 enters a predetermined area near the ETC entrance gate, wireless communication is started between the ETC fixed station side antenna 24 provided at the ETC entrance gate and the ETC antenna 22 of the motor vehicle 5. Through this communication, the ETC unit 21 and the display device 11 obtain the ETC entrance data including the entrance data 6 shown in FIG. 4 from the ETC fixed station 23.

The advertisement data included in the entrance data 6 obtained by the ETC unit 21 is sent to the display device 11 to display its contents, such as "GREAT DEALS ON . . . " according to the advertising data The display device 11 thus can obtain data necessary for the advertisement activity at the same time when communicating with the ETC fixed station 23 and use it.

Next, the advertising operation of the display device 11 will be described.

When the passenger, such as a driver, of the motor vehicle 5 starts the advertisement activity after entering the toll road, he/she operates the operation switch 12 to select a desired advertisement based on the advertising providers' names 63 and the advertisement contents 65 of the plural obtained advertisements and to input the activation of the display. The passenger can enjoy the advertisement activity because of such selectivity, by himself/herself, of the advertisement.

In response to the input operation of the activation, the display device 11 starts to display the selected advertisement contents 65, for example, "GREAT DEALS ON . . . ", "LET'S GO TO . . . ", and so on, by the light spots of many LEDs so that the display can be seen from behind the motor vehicle 5, as shown in FIG. 3. Thus, the advertisement is presented to passengers of motor vehicles running behind it.

When the advertisement display is started, the display device 11 obtains the advertisement time 74 based on time inputted from the timer 13 and the vehicle position information from the navigator 32. It further obtains the traveling distance data from the instrument C/U 33. The display device 11 also obtains the traveling distance based on the vehicle speed from the vehicle speed sensor 31 and map information from the navigator 32.

The advertisement thus displayed by the display device 11 has a high advertisement effect when the toll road is congested with motor vehicles since many motor vehicles follow the motor vehicle 5 having the display device 11 mounted thereon. The vehicle speed at the time of the advertisement display by the display device 11 is stored for use in certifying the high advertisement effect.

Especially when the traffic is heavy, the advertisement can give some diversion to passengers of the following motor vehicles and make them relaxed. On the advertising agency, too, the congestion leads to the longer display and higher effect of the advertisement which increases payment for its advertisement, consequently reducing a toll for the toll road and a driver's irritation.

Next, the data outputting operation when the motor vehicle 5 goes out of a toll road will be described.

When the motor vehicle 5, having thus presented the advertisement, goes out of the toll road to a general road, it passes through the ETC exit gate without stopping. At this time, it communicates with the ETC fixed station 23 so that a toll for the toll road can be charged by ETC. Namely, the exit data 7, constituted of the ETC exit data outputted from the ETC unit 21 and the display data outputted from the display device 11, is transmitted from the motor vehicle 5 to the ETC fixed station 23 via the ETC antenna 22 and the ETC fixed station side antenna 24 provided at the ETC exit gate.

The display data includes vehicle speed and the traveling distance when the advertisement was presented, which makes it possible to grasp individual condition during advertising even when the advertisement was displayed a plurality of times.

Such simultaneous communication for the advertisement activity with the communication for ETC toll charging for the toll road results in reduced equipment cost.

Next, the toll charging operation according to each condition will be described.

In the above-described manner, the ETC fixed station 23 can obtain the advertisement contents 65, the advertisement time, the traveling distance, the vehicle position, the vehicle speed when the advertisement was presented, and so on. Therefore, the charged amount can be set based on the obtained conditions involved with the actual advertisement effect. The payment is made with the ETC credit card, or by deducting from the toll for the toll road that is paid through the use of ETC. Besides, by the obtained conditions, the advertising provider can grasp whether the advertisement had a high effect due to the congestion or it did not have a high effect due to relatively high speed running on the toll road.

Next, advantages of the advertisement presenting and charging system 1 according to the embodiment will be described.

The advertisement presenting and charging system 1 of the embodiment can bring about the following advantages.

In the advertisement presenting and charging system 1, the display device 11 attached to a motor vehicle 5 displays an advertisement to outside the motor vehicle 5. The instrument C/U 33 and the navigator 32 are provided in the motor vehicle 5, and the display device 11 obtains information from the instrument C/U 33 and the navigator 32. The display device 11 has the timer 13 detecting time and the operation switch 12 for changeover between operation and non-operation of the display device 11. The display device 11 is connected to the ETC unit 21 and the ETC antenna 22. When communicating with the ETC fixed station 23, the display device 11 obtains the plural advertisement data so that an advertising agency is allowed to select the advertisement contents, and to charge for the advertisement according to the traveling section (places), traveling time, traveling distance for the advertisement actually presented by the display device 11. Therefore, on the advertising provider's side, amount of payment can be set according to the detailed contents of the advertisement so as to be more commensurate with the actual advertisement effect. On the other hand, on the advertising agency's side, irritation during traffic congestion is reduced because the amount of payment increases due to traffic congestion.

Further, an amount corresponding to the payment for the advertisement is deducted from a toll for a toll road, so that only a low toll is required for using the toll road. This accelerates use of toll roads.

The entrance data, including the number of advertisements 61, the advertisement IDs 62, the advertising providers' names 63, the number of advertisement characters 64, the advertisement contents 65, is sent from the ETC fixed station 23 to the display device 11 through the communication with the ETC system when a motor vehicle 5 enters a toll road. The exit data, including the number of advertisements. 71, the advertisement IDs 72, the number of advertisement times 73, the advertisement time 74, and the advertisement places 75, is sent from the display device 11 to the EYC fixed station 23 through the communication with the ETC system when the motor vehicle 5 goes out of the toll road. Therefore, owing to the use of the ETC system, this system 1 can reduce the number of communication times and cost necessary for changing the advertisement contents and charging and cost of equipment.

In the foregoing, the advertisement presenting and charging system 1 of the present invention is described based on the embodiments. However, the specific configuration is not limited to these embodiments, and any change, addition, and so on in design are embraced therein without departing from the spirit of the present invention according to the claims.

Figure 6:
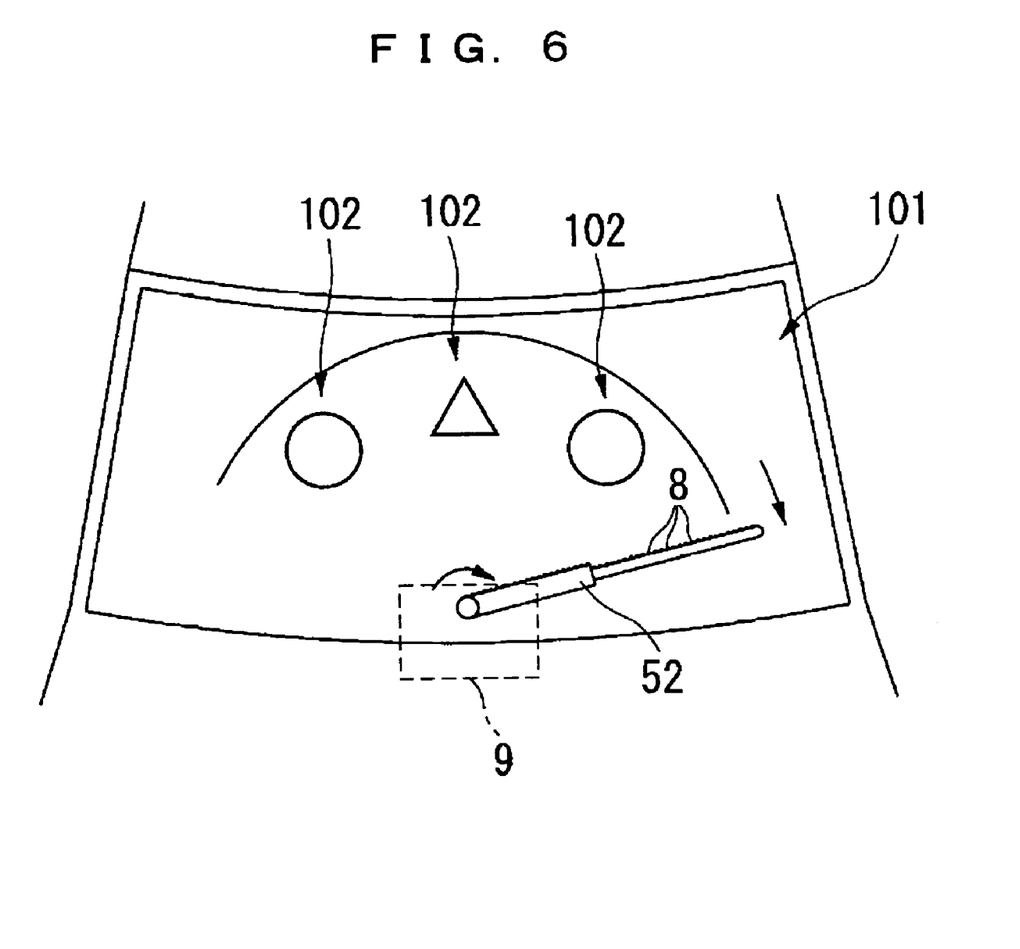
FIG. 6 is a perspective view showing another example of the display device of the advertisement presenting and charging system of the embodiment in place of the display device shown in FIG. 3.

For example, as a display device 11, a wiper with LEDs, shown in FIG. 6, may be adopted. Specifically, the wiper 52 has a large number of LED groups 8, and the LED groups 8 are controlled by a display control device 9. When the wiper 52 is operated, light emission by the LED groups 8 generates afterglow 101 in conjunction with the movement of the wiper 52 to display characters 102. In this manner, conspicuous and eye-catching display is made possible.

In stead of the ETC, a different system may be used as the automatic toll collecting system for toll road.

Further, the exit data 7 may be constituted of the number of advertisements 71, the advertisement IDs 72, the number of advertisement times 73, the advertisement time 74, and the advertisement places 75.

What is claimed is:

1. An on-board devices for an advertisement presenting and charging system comprising:
    a wireless communicating unit to receive an entrance data including an advertisement data from an automatic toll collecting system and send an exit data to said automatic toll collecting system;
    a display device to display an advertisement based on the advertisement data included in said entrance data; and
    a detector to detect information about a condition under which the advertisement is displayed by said display device to send said exit data including the information about the condition to be a base of charging amount of the advertisement.

2. An on-board devices for an advertisement presenting and charging system according to claim 1,
    wherein the information about the condition includes at least one of a traveling section, a traveling time, and a traveling distance during displaying the advertisement.

3. An on-board devices for an advertisement presenting and charging system according to claim 1,
    further comprises a switching unit to shift to one of operation and non-operation of said display device and select advertisement contents to be displayed based on the advertisement data included in the entrance data.

4. An on-board devices for an advertisement presenting and charging system according to claim 1, wherein the amount of the advertisement charge is deducted from a toll for a toll road.

5. An on-board devices for an advertisement presenting and charging system according to claim 1, said entrance data includes number of advertisements, an advertisement ID, an advertising provider's name, number of advertisement characters, and the advertisement, and the exit data including number of advertisements, the advertisement ID, number of advertisement times, advertisement time, and the advertisement.

* * * * *